US012808520B2

(12) United States Patent
Sanson

(10) Patent No.: US 12,808,520 B2
(45) Date of Patent: Nov. 24, 2026

(54) ADJUSTABLE TRACK FOR LIGHTING DEVICE FOR POOLS

(71) Applicant: BELLSON ELECTRIC PTY LTD, Caringbah (AU)

(72) Inventor: David John Sanson, Taren Point (AU)

(73) Assignee: BELLSON ELETRIC PTY LTD, Caringbah (AU)

( * ) Notice: Subject to any disclaimer, the term of this patent is extended or adjusted under 35 U.S.C. 154(b) by 0 days.

(21) Appl. No.: 19/317,632

(22) Filed: Sep. 3, 2025

(65) Prior Publication Data

US 2026/0063279 A1 Mar. 5, 2026

Related U.S. Application Data

(60) Provisional application No. 63/690,529, filed on Sep. 4, 2024.

(51) Int. Cl.

| | |
|---|---|
| ***F21V 21/005*** | (2006.01) |
| ***F21V 21/14*** | (2006.01) |
| ***F21W 131/401*** | (2006.01) |
| ***F21Y 103/30*** | (2016.01) |

(52) U.S. Cl.

CPC ............ *F21V 21/005* (2013.01); *F21V 21/14* (2013.01); *F21W 2131/401* (2013.01); *F21Y 2103/30* (2016.08)

(58) Field of Classification Search

CPC . F21V 21/005; F21V 21/14; F21W 2131/401; F21Y 2103/30

See application file for complete search history.

(56) References Cited

U.S. PATENT DOCUMENTS

| | | | | |
|---|---|---|---|---|
| D220,833 S | 6/1971 | Haskell et al. | | |
| D306,079 S | 2/1990 | Whitney | | |
| D317,513 S | 6/1991 | Miller | | |
| D318,343 S | 7/1991 | Miller et al. | | |
| D320,094 S | 9/1991 | Miller et al. | | |
| D345,268 S | 3/1994 | Pate | | |
| 5,448,460 A * | 9/1995 | Belfer | F21S 4/20 | 362/225 |
| D377,223 S | 1/1997 | Macri | | |
| D445,211 S | 7/2001 | Baker | | |
| D471,994 S | 3/2003 | Chaney et al. | | |
| D534,790 S | 1/2007 | Garda | | |

(Continued)

FOREIGN PATENT DOCUMENTS

| | | |
|---|---|---|
| AU | 2019100121 A4 | 3/2019 |
| CN | 200530025818.0 | 2/2006 |
| KR | 3019980008976 | 6/1999 |

*Primary Examiner* — Tsion Tumebo

(74) *Attorney, Agent, or Firm* — HAYES SOLOWAY P.C.

(57) ABSTRACT

An adjustable track for a lighting device has a body with a channel structure having a center axis aligned with a length thereof. The channel structure is configured to hold a lighting unit. At least two mounting members extend from the channel structure. The mounting members are positioned at an angle relative to the center axis. The shape of the channel structure is adjustable, thereby adjusting the center axis. In one example, the shape of the channel structure is adjustable along a length thereof between at least: a straight shape, an inward curved shape, or an outward curved shape to substantially match a shape of a perimeter section of a pool, to thereby illuminate water within the pool.

18 Claims, 12 Drawing Sheets

(56) References Cited

U.S. PATENT DOCUMENTS

| | | | | |
|---|---|---|---|---|
| 7,213,941 | B2 * | 5/2007 | Sloan | F21S 4/26 362/240 |
| D573,723 | S | 7/2008 | Vibiano | |
| D602,346 | S | 10/2009 | Allsopp | |
| D683,893 | S | 6/2013 | Ransvi | |
| D695,955 | S | 12/2013 | Klus | |
| 8,613,525 | B2 | 12/2013 | Shimizu et al. | |
| D731,700 | S | 6/2015 | Santoro | |
| D733,354 | S | 6/2015 | Klus | |
| D740,479 | S | 10/2015 | Beno | |
| D757,993 | S | 5/2016 | Klus | |
| 9,638,381 | B2 * | 5/2017 | Cavaliere | F21V 17/107 |
| D808,578 | S | 1/2018 | Klus | |
| D808,579 | S | 1/2018 | Klus | |
| D818,633 | S | 5/2018 | Barker | |
| D822,228 | S | 7/2018 | Wang et al. | |
| D824,584 | S | 7/2018 | Klus | |
| D847,381 | S | 4/2019 | Ksiezopolski et al. | |
| D847,412 | S | 4/2019 | Trzcielinski | |
| D851,786 | S | 6/2019 | Ksiezopolski et al. | |
| D868,352 | S | 11/2019 | Trzcielinski | |
| D868,355 | S | 11/2019 | Trzcielinski | |
| D869,078 | S | 12/2019 | Trzcielinski | |
| D892,355 | S | 8/2020 | Helms | |
| D904,675 | S | 12/2020 | Trzcielinski | |
| D921,477 | S | 6/2021 | Edward | |
| 11,242,967 | B1 * | 2/2022 | Tang | F21S 8/036 |
| D968,207 | S | 11/2022 | Lake | |
| D990,033 | S | 6/2023 | Klus | |
| D1,008,490 | S | 12/2023 | Mumford, Sr. | |
| D1,035,918 | S | 7/2024 | Singh | |
| 12,060,985 | B1 * | 8/2024 | Chen | F21V 21/26 |
| D1,087,399 | S | 8/2025 | Steele | |
| 2009/0094734 | A1 * | 4/2009 | Diebel | E04H 4/14 4/506 |
| 2012/0262916 | A1 * | 10/2012 | Gadda | F21S 8/022 156/60 |
| 2018/0031190 | A1 * | 2/2018 | Nicolai | F21S 4/24 |
| 2018/0320840 | A1 * | 11/2018 | Machlis | F21V 17/002 |
| 2018/0347789 | A1 * | 12/2018 | Moore | F21V 23/002 |
| 2019/0101256 | A1 * | 4/2019 | Hartman | F21V 23/06 |
| 2021/0239280 | A1 * | 8/2021 | Monestier | F21S 4/24 |

* cited by examiner

ADJUSTABLE TRACK FOR LIGHTING DEVICE FOR POOLS

CROSS REFERENCE TO RELATED APPLICATION

This application claims benefit of U.S. Provisional Application Ser. No. 63/690,529 entitled, "Adjustable track for lighting device for pools" filed Sep. 4, 2024, the entire disclosure of which is incorporated herein by reference.

FIELD OF THE DISCLOSURE

The present disclosure is generally related to lighting features for pools and more particularly is related to adjustable lighting mounts for pools.

BACKGROUND OF THE DISCLOSURE

Lighting features are commonly used to both enhance the appearance and ambiance of a pool, spa, or similar environment, as well as to make a pool experience more enjoyable for children and adults alike. Several forms of pool lighting exist, including standard in ground pool lights, which illuminate the water within a pool from a sidewall. Other pool lighting methods include trim lighting, that is, lighting along the perimeter of a pool. However, fitting of lighting systems that travel along the perimeter of a pool is challenging, as pools will often have different shapes. Thus, lighting systems often need to be custom made for each pool which increases cost and labor, and often doesn't result in the lights facing in the desired direction.

Thus, a heretofore unaddressed need exists in the industry to address the aforementioned deficiencies and inadequacies.

SUMMARY OF THE DISCLOSURE

Embodiments of the present disclosure provide an adjustable track for a lighting device. Briefly described, in architecture, one embodiment of the system, among others, can be implemented as follows. A body has a channel structure with a center axis aligned with a length thereof. The channel structure is configured to hold a lighting unit. At least two mounting members extend from the channel structure. The mounting members are positioned at an angle relative to the center axis. The shape of the channel structure is adjustable, thereby adjusting the center axis.

The present disclosure can also be viewed as providing a pool lighting device. Briefly described, in architecture, one embodiment of the device, among others, can be implemented as follows. A body has a channel structure with a center axis aligned with a length thereof. At least two mounting members extend from the channel structure, wherein the mounting members are positioned at an angle relative to the center axis, and wherein the shape of the channel structure is adjustable to substantially match a shape of a perimeter section of a pool, thereby adjusting the center axis. A lighting unit is held within the channel structure, wherein the lighting unit is configured to illuminate a quantity of water within the pool.

The present disclosure can also be viewed as providing a shape-adjustable pool lighting device. Briefly described, in architecture, one embodiment of the device, among others, can be implemented as follows. A body has a channel structure. At least two mounting members extend from the channel structure, wherein the mounting members are positioned at an angle relative to the channel structure, and wherein the shape of the channel structure along a length thereof is adjustable between at least: a straight shape, an inward curved shape, or an outward curved shape to substantially match a shape of a perimeter section of a pool. A lighting unit is held within the channel structure, wherein the lighting unit is configured to illuminate a quantity of water within the pool.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claim.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figures 1A, 1B:
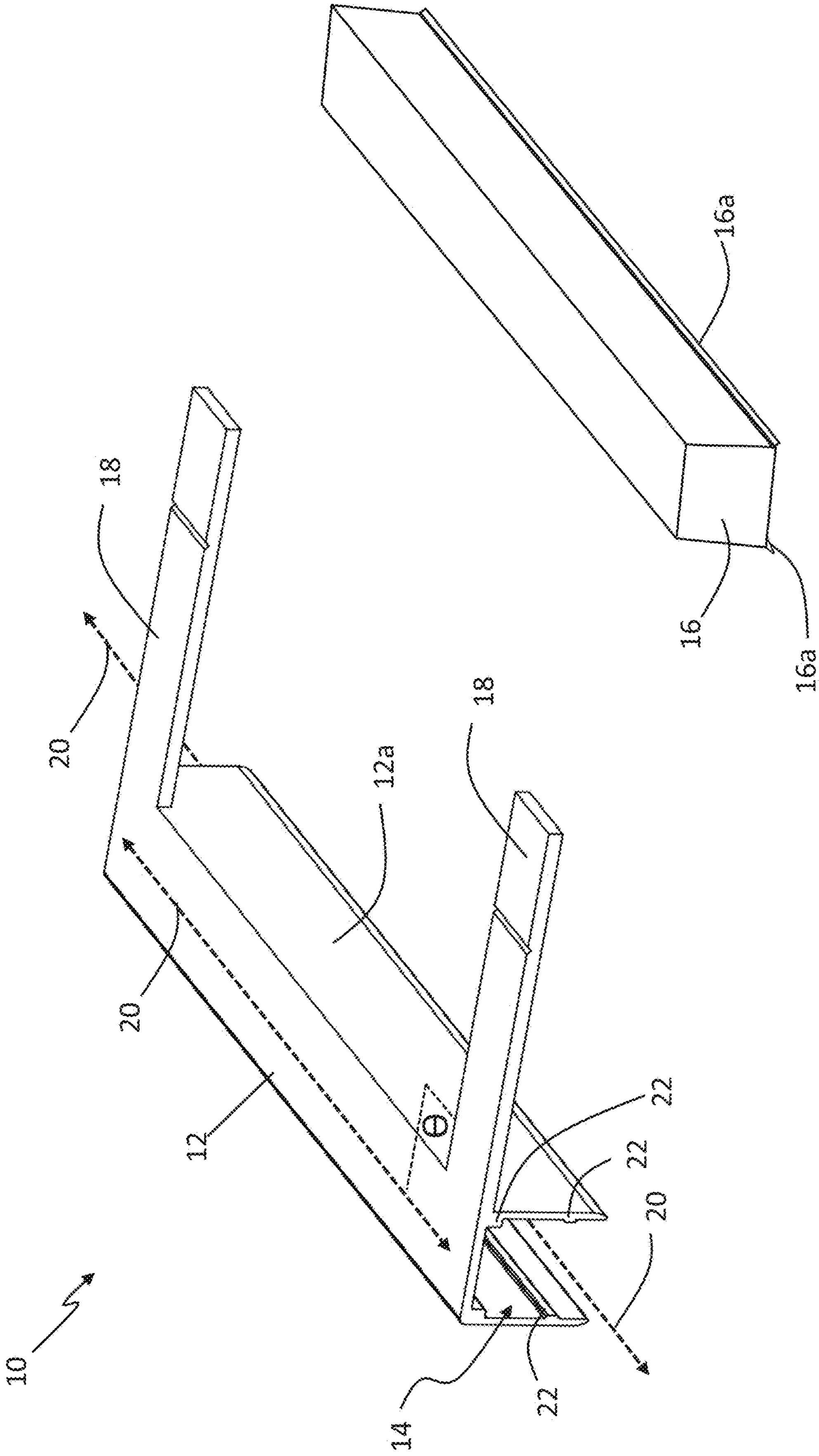
FIG. 1A is an isometric view illustration of an adjustable lighting mount, in accordance with the present disclosure.
FIG. 1B is an isometric view illustration of a lighting unit, in accordance with the present disclosure.

Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1A is an isometric view illustration of an adjustable lighting mount 10 and FIG. 1B is an isometric view of a lighting unit 16, in accordance with the present disclosure. As shown, the adjustable lighting mount 10 has a body 12 with a channel structure 14 having a center axis 20. The channel structure 14 may be configured to hold a lighting unit 16. At least two mounting members 18 may extend from the channel structure 14 or housing 12, wherein the at least two mounting members 18 are positioned at an angle θ relative to the center axis 20. In some examples, the adjustable lighting mount 10 may include more than two mounting members 18. In other examples, the adjustable lighting mount 10 may include only one mounting member 18.

The at least two mounting members 18 may extend generally from the top surface of the body 12, such that the top surface of the mounting members 18 is substantially flush, and has a continuous face, with the top surface of body 12. This continuous surface between the top of the body 12 and the top of the mounting members 18 may assist with ensuring that the channel structure 14 is positioned correctly relative to the pool edge, such that the pool deck is positioned over the mounting members 18 and sits flush with the coping over or near the body 12. The mounting members 18 may have a width dimension which is selected based on the design and intended use of the mount 10, such as with a relatively small width in comparison to the overall length of the body 12.

The channel structure 14 may be defined by the body 12, which has two opposing sidewalls 12*a*, whereby a channel or interior slot is formed as a space between two opposing sidewalls 12*a*. In some embodiments, sidewalls 12*a* may extend perpendicularly from a flat face of body 12, which may be considered the top face of the body 12 when the adjustable lighting mount 10 is in use. In other examples, sidewalls 12*a* may extend out from the flat face of body 12 at angles other than ninety-degrees. According to some embodiments, sidewalls 12*a* may have a distal portion furthest from body 12 and a proximal portion closest to body 12. In further embodiments, the distal portion may include a beveled edge.

The center axis 20 of the channel structure 14 is understood to be a theoretical line that runs along the length of the channel structure 14. For example, as shown in FIG. 1A, center axis 20 is substantially parallel with sidewalls 12*a*. Additionally, in some embodiments, center axis 20 may be configured to be tailored, thereby adjusting the shape of channel structure 14. For instance, and described in more detail below, center axis 20 may be configured to change from a substantially straight shape which matches a straight line to a substantially curved shape, including an inward curved or bent shape or an outward curved or bent shape, when the adjustable lighting mount 10 is acted upon by a force. In all cases, center axis 20 may still be substantially parallel with sidewalls 12*a* because sidewalls 12*a* would also be curved after the force applied to adjustable lighting mount 10.

The channel structure 14 may have a plurality of mounting tracks 22 which are positioned within the channel structure 14 and shaped to mechanically retain the lighting unit 16. For instance, the mounting tracks may correspond to a plurality of lighting tracks 16*a* on a lighting unit 16 to retain the lighting unit 16 within the channel structure 14. The plurality of mounting tracks 22 of the channel structure 14 may have a mateable shape, such as either male or female to accommodate the plurality of lighting tracks 16*a* of the lighting unit 16. In one example, where the plurality of mounting tracks 22 are shaped as female mounting tracks 22, the plurality of lighting tracks 16*a* may be male lighting tracks 16*a*, such that the plurality of lighting tracks 16*a* can fit in the plurality of mounting tracks 22. The plurality of mounting tracks 22 may also be male mounting tracks 22. Accordingly, the plurality of lighting tracks 16*a* may be female, so that the plurality of lighting tracks 16*a* can fit within the plurality of mounting tracks 22. In other examples, the plurality of mounting tracks 22 may be configured to function as a shelf, where the plurality of lighting tracks 16*a* may be slid into place and rest on a surface of the plurality of mounting tracks 22. In other examples, lighting unit 16 may be configured to interface with adjustable lighting mount 10 by snapping into sidewalls 12*a*, without interfacing with mounting tracks 22. For example, sidewalls 12*a* may be configured to envelope lighting unit 16 and hold lighting unit 16 by pressure and/or friction. Other suitable methods for interfacing lighting unit 16 with adjustable lighting mount 10 will be apparent in light of the present disclosure.

The body 12 may be made of any material such as vinyl, PVC, rubber, or any other material that is capable of being bent or repositioned from a neutral position. A neutral position is understood to mean a position where the two mounting members 18 are positioned at an angle θ relative to the center axis 20, where the angle θ is substantially a right angle, where minor variances in the angle θ caused by manufacturing processes or through packaging, or otherwise are also considered to be within the understanding and meaning of neutral position.

Figure 2:
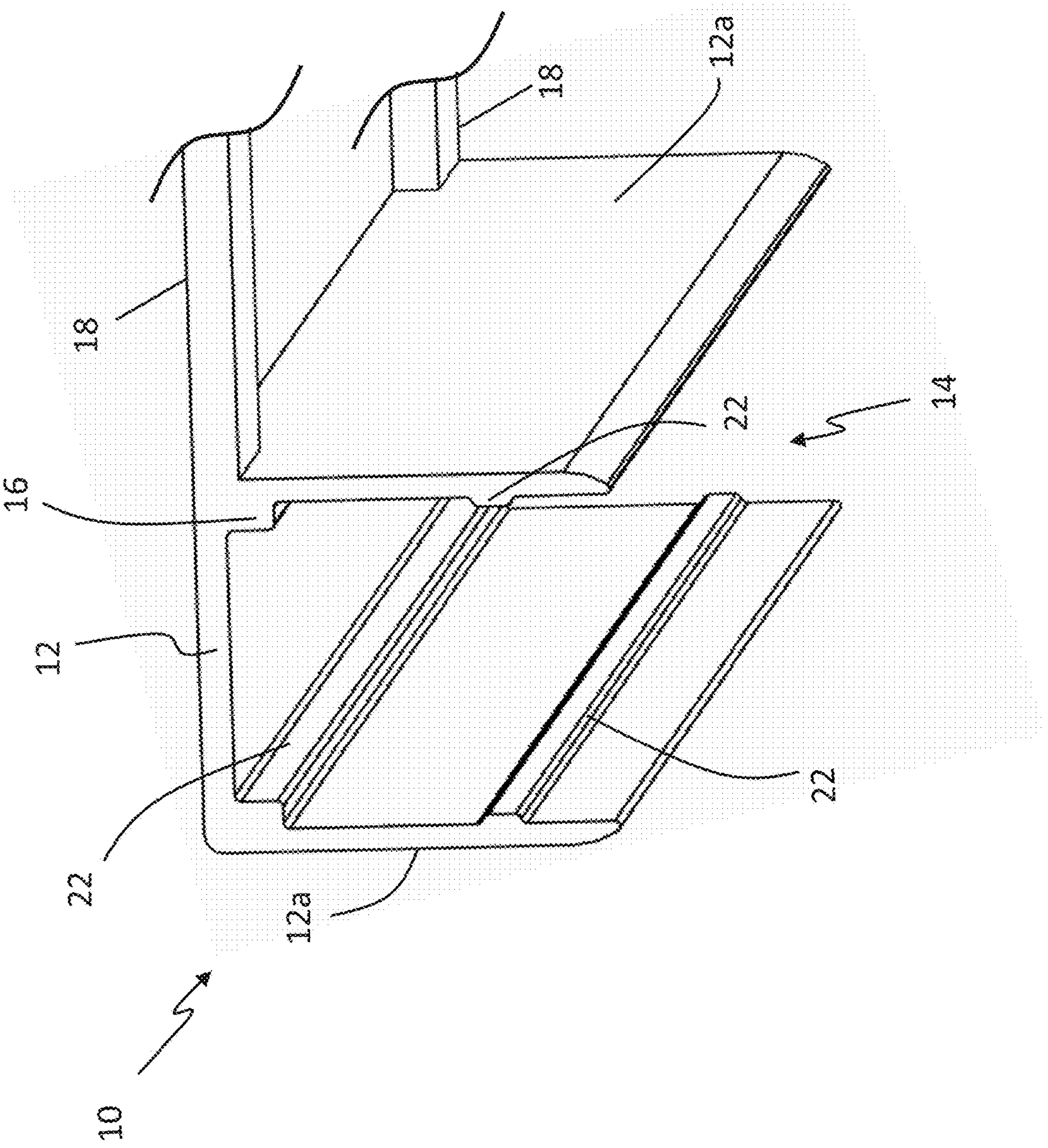
FIG. 2 is an isometric close-up view illustration of the adjustable lighting mount of FIG. 1, in accordance with the present disclosure.

FIG. 2 is an isometric close-up view illustration of the adjustable lighting mount 10 of FIG. 1, in accordance with the present disclosure. Depicted is another view of the adjustable lighting mount 10 with the interior of the channel structure 14, along with the plurality of mounting tracks 22 more clearly visible. The plurality of mounting tracks 22 may be positioned on the sidewall 12*a* of the body 12, on a face of the sidewall 12*a* that defines the area of the channel 14. Each opposing sidewall 12*a* may have a plurality of mounting tracks 22. For example, in accordance with some embodiments, and shown in FIG. 2, a first sidewall 12*a* may include two or more mounting tracks 22 and a second sidewall 12*a* may also include two or more mounting tracks 22. In this case, a lighting unit 16, including lighting tracks 16*a*, may be configured to interface with the two or more mounting tracks 22 on both sidewalls 12*a*. In doing so, a first set of two lighting tracks 16*a* on a first side of lighting unit 16 may interface with the two or more mounting tracks 22 on the first sidewall 12*a*, the body of lighting unit 16 may span channel structure 14 and a second set of two lighting tracks 16*a* on a second side of lighting unit 16 may interface with the two or more mounting tracks 22 on the second sidewall 12*a*. In other examples, sidewall 12*a* may only have a single mounting track 22. In some embodiments, when body 12 has a single mounting track 22, the corresponding lighting track 16*a* on lighting unit 16 may be configured to interface with the adjustable lighting mount 10 through only the single mounting track 22. FIG. 2 contains many of the same features, structures, and functions as described relative to FIG. 1, which are not restated for FIG. 2 for brevity in disclosure.

In use, the adjustable lighting mount 10 may be mounted to the side edge area of a pool, such as along an interface between a pool decking or underlayment thereof, and the sidewall of the pool. A pool with a substantially straight edge, e.g., portion of a perimeter, may be used with the adjustable lighting mount 10 in a straight configuration, as is shown in FIG. 1A. However, when a pool has a curved, arched, or otherwise non-straight edge or portion of a perimeter thereof, the adjustable lighting mount 10 may be adjusted to allow the channel structure 14 to match or substantially match the shape of the pool.

In some examples, the body 12 may be bent or repositioned into any non-permanent shape or repositioning. Non-permanent shape or repositioning is understood to mean that the body 12 can be shaped or bent by a user and can subsequently be re-shaped or bent by a user. In some examples, the body 12, when shaped or bent from a neutral position, such as that shown in FIG. 1A, may semi-permanently remain in the shaped or bent position. Semi-permanently is understood to mean that the body 12, once shaped or bent, may remain in the shaped or bent shape without fastening the body 12 into the said shaped or bent position, and without the application of any external force. However, the body 12 can still be reshaped or bent additionally into another shaped or bent position by a user.

In another example, the body 12, when shaped or bent out of a neutral position, may require a consistent application of an external force or a biased force to maintain the shaped or bent position. External force may be through a fastener, which secures the body 12 to a surface into a shaped or bent position. In this example, when the fastener, or other external force on the body 12 is released, the body 12 may revert back or restore itself to the neutral position. As an example, the body 12 may be bent or shaped into a position which matches the edge shape of a pool, whereby the mounting members 18 are then retained in place, such as with threaded fasteners, adhesives, or the like, to allow the channel structure 14 to maintain that position.

In yet another example, the body 12 may be made of a material that, when shaped or bent out of a neutral position, may remain in the shaped or bent position permanently. Permanently is understood to mean that the body 12 stays in the shaped or bent position without any force actively keeping body 12 in the shaped or bent position. To this end, body 12 may be configured to cure or otherwise harden, which may occur through a chemical process, due to sun exposure, through the application of heat, or a chemical reaction that may cause the body 12 to remain in the shaped or bent position. In some additional embodiments, the curing or hardening may result from the presence or absence of chemical additives in body 12. In this example, the body 12 may not be restored to the neutral position without damaging the body 12.

The mounting members 18 may be molded, formed, or otherwise created using the same material of the body 12, thus forming a single, unitary structure as the body 12, channel structure 14 therein, and mounting members 18 extending from the body 12. In some examples however, a different material may be used for the mounting members 18 to create a relatively stiffer and non-malleable, non-bendable, or non-shapable mounting member 18. This material may include a stiffer PVC or vinyl material, or any material that may be more stiff than the body 12. This may be the case, as the mounting members 18 themselves may be used to shape the body 12, and furthermore to secure the body 12 to a surface, such as along the perimeter of a pool. Examples of the mounting members 18 being used to bend the body 12 are discussed and illustrated in further detail in FIGS. 3A-6.

According to some embodiments, and shown at least in FIG. 1A, mounting members 18 may be configured to interface at an edge of body 12 defining channel 14 perpendicular to axis 20. For example, mounting members 18 may extend from and be a continuation of the edge of body 12 defining channel 14 perpendicular to axis 20, such that the edge of body 12 defining channel 14 perpendicular to axis 20 and an edge of mounting members 18 may share the face of the edge of body 12 defining the channel and perpendicular to axis 20. In other examples, mounting members may interface with a middle portion of body 12, or anywhere along body 12, such that mounting members 18 do not share the face of the edge of body 12 defining channel 14 and perpendicular to axis 20. Other suitable interfacing locations for mounting members 18 may be apparent in light of this disclosure.

Figure 3B:
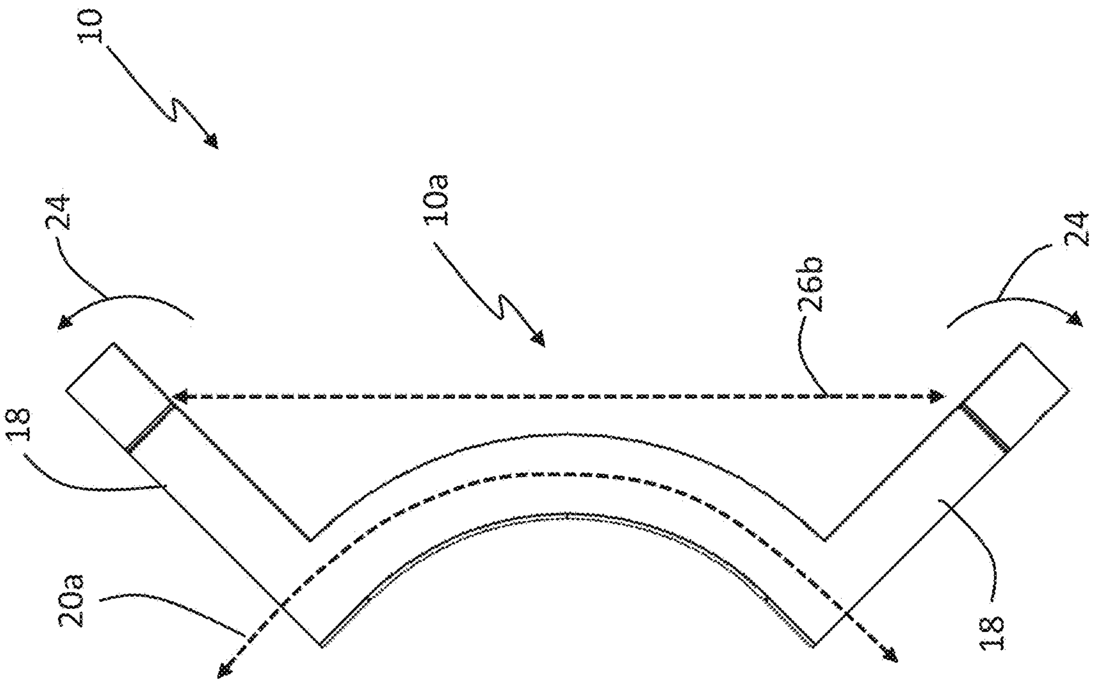
FIGS. 3A-3B are a top view illustration of the adjustable lighting mount in a neutral position and an outwards bent position, respectively, in accordance with the present disclosure.
Figure 3A:
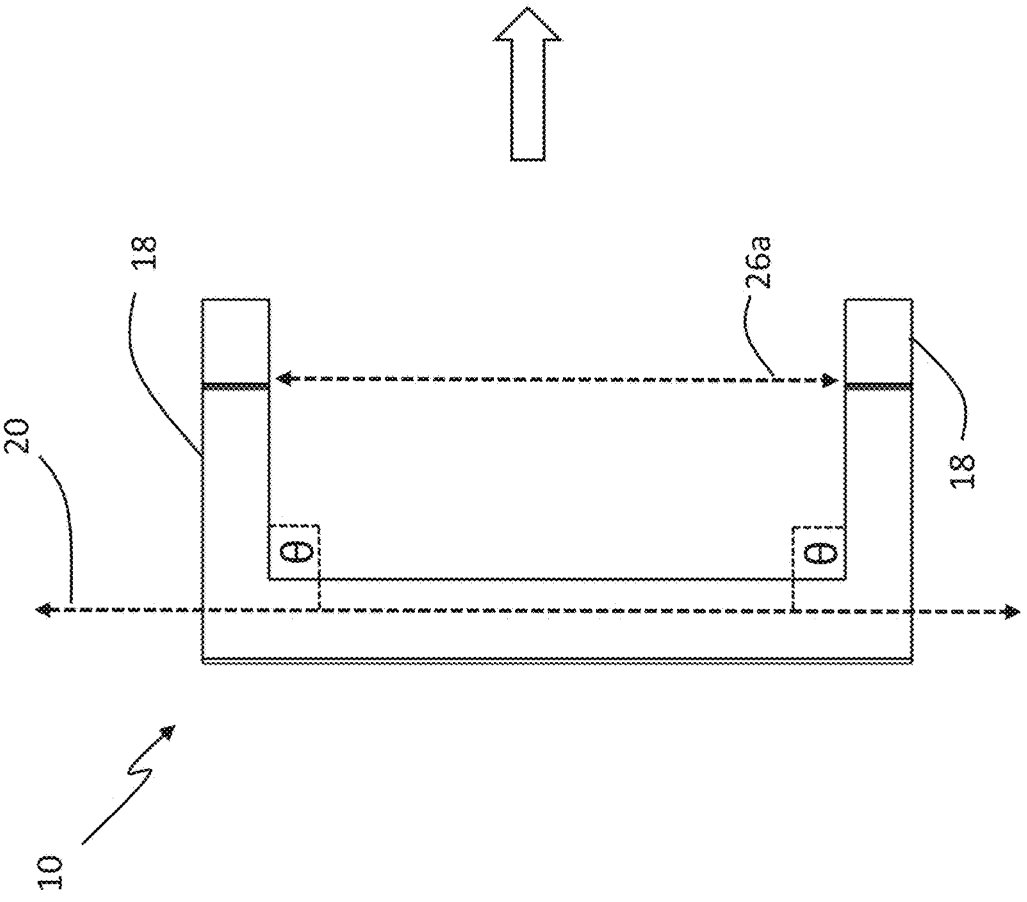

FIGS. 3A-3B are a top view illustration of the adjustable lighting mount 10 in a neutral position and an outwards bent position 10*a*, respectively, in accordance with the present disclosure. FIG. 3A depicts the adjustable lighting mount 10 in the neutral position, where the two mounting members 18 are positioned at a substantially right angle relative to the center axis 20, while FIG. 3B illustrates the adjustable lighting mount 10 positioned in the outside bent position 10*a*. The outside bent position 10*a* may be understood to mean that the central axis 20 is a nonlinear central axis 20*a*. As seen in FIGS. 3A-3B, angle θ may be configured to differ between the neutral position and outwards bent position 10*a*. For example, in the neutral position, angle θ, between central axis 20 and mounting member 18, may be configured to be at a substantially right angle, as described above. In outwards bent position 10*a*, central axis 20 may be substantially bent to form a substantially non-linear central axis 20*a*. Moreover, in outwards bent position 10*a*, mounting members 18 may be pushed outward, creating a greater than ninety-degree angle θ between central axis 20*a* and mounting members 18. In other words, when adjustable lighting mount 10 may be in outwards bent position 10*a*, the angle θ between the central axis 20*a* and the mounting members 18 may be obtuse.

Changes in position may also be understood based on differences in a distance between the mounting members 18. For example, when the two mounting members 18 of the adjustable lighting mount 10 are in the neutral position, they may be positioned at a first distance 26*a* away from one another, which is a neutrally positioned distance away from one another. In the outwards bent position 10*a*, the two mounting members 18 may be positioned at a second distance 26*b* away from one another, which is an outwardly bent distance away from one another. The first distance 26*a* between the two mounting members 18 may be a shorter distance than the second distance 26*b* between the two mounting members 18. In the example depicted in FIGS. 3A-3B, this difference between the first and second distance 26*a*, 26*b* between the mounting members 18 of the neutrally positioned and the outwards bent positioned 10*a* may remain true of almost all linear measurements taken between the two mounting members 18 where the end points for measurements correspond to one another, and where the distance measurement is taken at any point other than the point forming the angle θ between the body 12 and the mounting members 18.

The adjustable lighting mount 10 may be positioned or bent by applying a force 24 on each of the mounting members 18. For positioning or bending the adjustable lighting mount 10 in the outwards bent position 10*a*, an outwards force 24 is applied to each of the mounting members 18.

It is noted that the adjustable lighting mount 10 may be positioned or bent in various ways. For example, in some embodiments, adjustable lighting mount 10 may be configured to bend only in a substantially inward/outward direction, as shown in FIGS. 3A-3B and FIGS. 5A-5B, wherein two mounting members 18 and channel 14 bend around a midpoint between two mounting members 18 and within channel 14. In other examples, the adjustable lighting mount may be configured to bend at more points than just around the midpoint, and thereby forming channel 14 into a substantially S-shaped channel 14 or curved channel 14.

Figure 4:
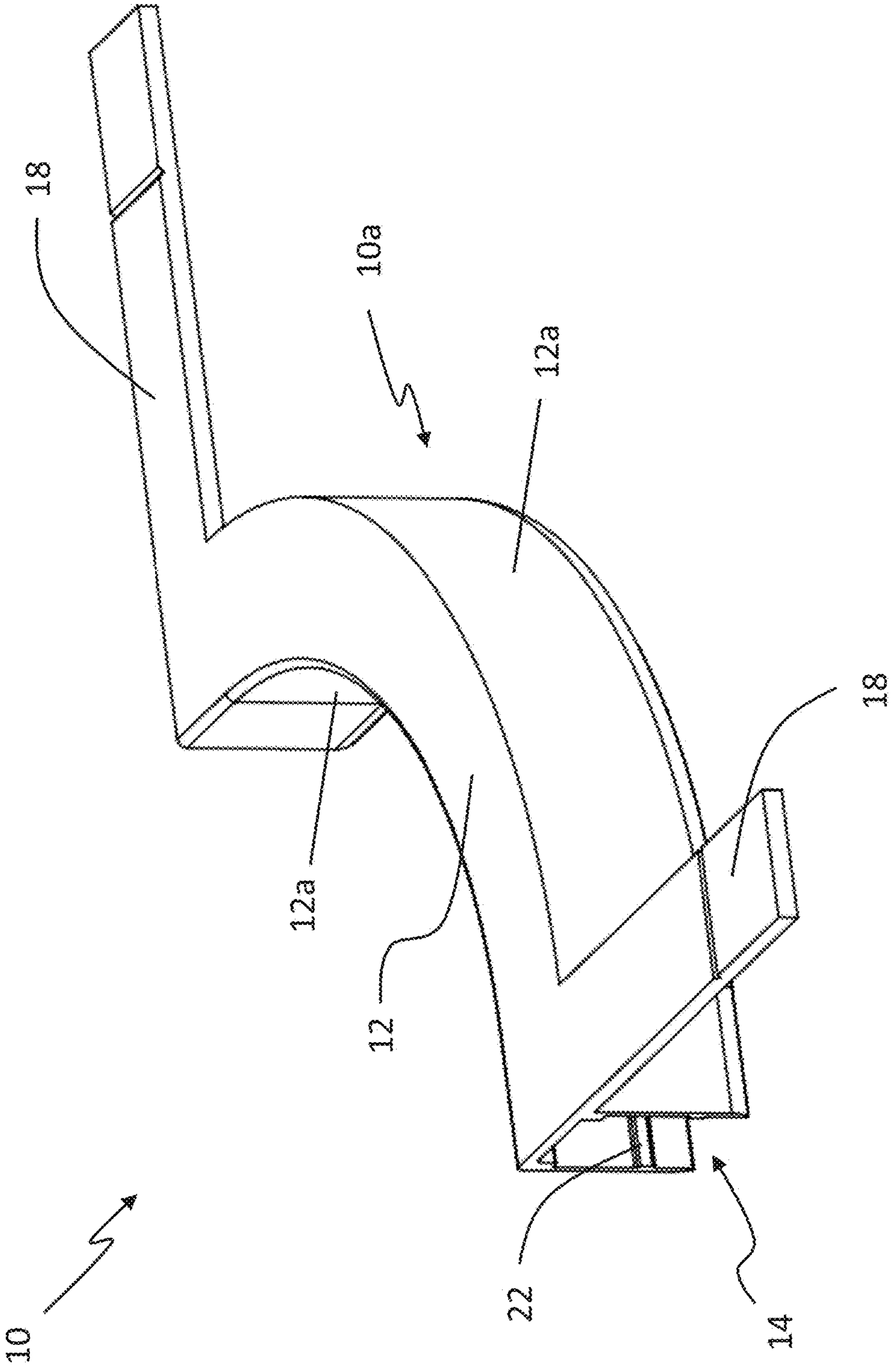
FIG. 4 is an isometric view illustration of the adjustable lighting mount in an outwards bent position, in accordance with the present disclosure.

FIG. 4 is an isometric view illustration of the adjustable lighting mount 10 in an outwards bent position 10*a*, in accordance with the present disclosure. Depicted is the channel structure 14 and mounting track 22 therein, where the body 12 of the adjustable lighting mount 10 is in an outwards bent position 10*a*. With reference to FIGS. 1A-1B and 4, in this configuration a lighting unit 16 may be mounted within the channel structure 14, and the body 12 or the entirety of the adjustable lighting mount 10 may be further mounted to a pool deck, at the edge of a pool, or at any surface edge that has outside and inside bends that are of various curvatures and shapes. FIG. 4 may include many of the same features, structures, and functions as described relative to FIGS. 1-3B, which are not restated for FIG. 4 for brevity in disclosure.

The lighting mount 10 may be mounted such that the mounting members 18 are substantially level or parallel with respect to the surface edge or overhang, and a sidewall 12*a* of the body 12 rests against the surface edge, in this example, the edge of a pool decking. In this configuration, the lighting unit 16 faces downwards and into the water of the pool, illuminating the pool water along the edges. In other examples, the body 12 will be mounted under the surface edge of the pool decking such that the body 12 and the entirety of the adjustable lighting mount 10 may be hidden from view when looking at the pool from above. In this configuration, the pool surface water is illuminated from the edges. In an alternative example, the adjustable lighting mount 10 may be configured such that the lighting unit 16 faces in any direction, including towards persons or objects in the pool, upwards, or towards the edge of the pool decking. Each lighting configuration may have certain advantages in terms of pool aesthetics and ambiance achieved. FIG. 4 contains many of the same features, structures, and functions as described relative to FIGS. 1-3B, which are not restated for FIG. 4 for brevity in disclosure.

Figure 5B:
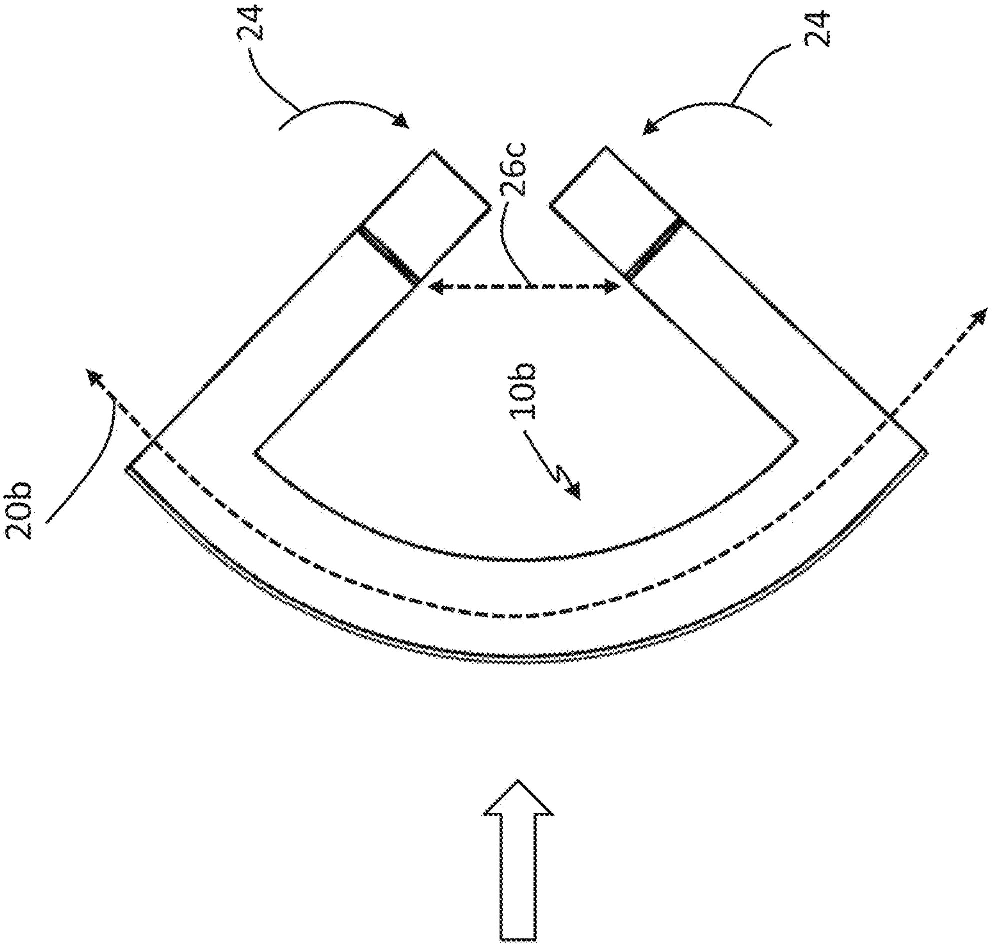
FIGS. 5A-5B are a top view illustration of the adjustable lighting mount in a neutral position and an inwards bent position, respectively, in accordance with the present disclosure.
Figure 5A:
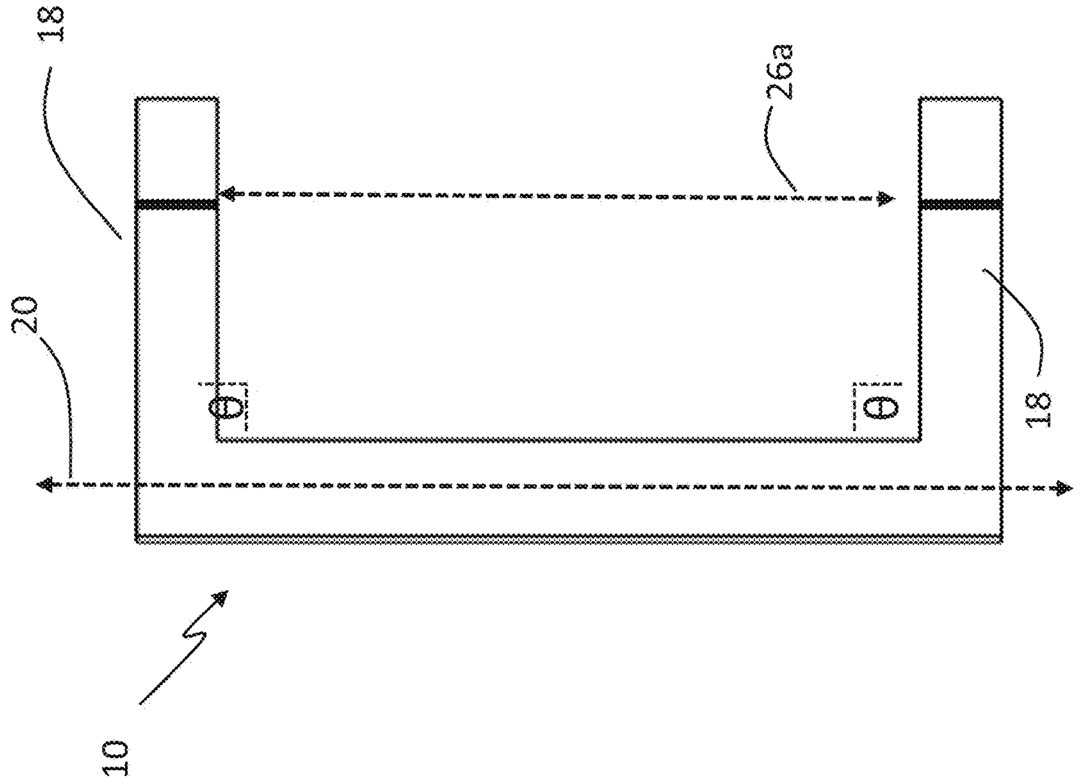

FIGS. 5A-5B are a top view illustration of the adjustable lighting mount 10 in a neutral position and an inwards bent position 10*b*, respectively, in accordance with the present disclosure. FIG. 5A depicts the adjustable lighting mount 10 in the neutral position, where the two mounting members 18 are positioned at a substantially right angle relative to the center axis 20 and FIG. 5B depicts the adjustable lighting mount 10 positioned in the inwards bent position 10*b*. In the inwards bent position 10*b*, the central axis 20 is a nonlinear central axis 20*b*. As seen in FIG. 5A, angle θ may be configured to differ between the neutral position and inwards bent position 10*b*. For example, in the neutral position, angle θ, between central axis 20 and mounting member 18, may be configured to be at a substantially right angle, as described above. In inwards bent position 10*b*, central axis 20 may be substantially bent to form a substantially non-linear central axis 20*b*. Moreover, mounting members 18 are pushed inward, creating a less than ninety-degree angle θ between the central axis 20*b* and mounting members 18. In other words, when adjustable lighting mount 10 is in inwards bent position 10*b*, angle θ between central axis 20*b* and mounting members 18 may be substantially acute.

In the same respect, the two mounting members 18 of the adjustable lighting mount 10 in the neutral position are positioned at a first distance 26*a* away from one another, which is a neutrally positioned distance away from one another. In the inwards bent position 10*b*, the two mounting members 18 are positioned at a third distance 26*c* away from one another, which is an inwardly bent distance away from one another. The first distance 26*a* between the two mounting members 18 is a larger distance than the third distance 26*c* between the two mounting members 18. This difference between the first and third distance 26*a*, 26*c* between the mounting members 18 of the neutrally positioned and the inwards bent positioned 10*b* adjustable lighting mount 10 remains true of almost all linear measurements taken between the two mounting members 18 where the end points for measurements correspond to one another, and where the distance measurement is taken at any point other than the point forming the angle θ between the body 12 and the mounting members 18.

The adjustable lighting mount 10 may be positioned or bent by applying a force 24 on each of the mounting members 18. For positioning or bending the adjustable lighting mount 10 in the inwards bent position 10*b*, an inwards force 24 is applied to each of the mounting members 18.

Figure 6:
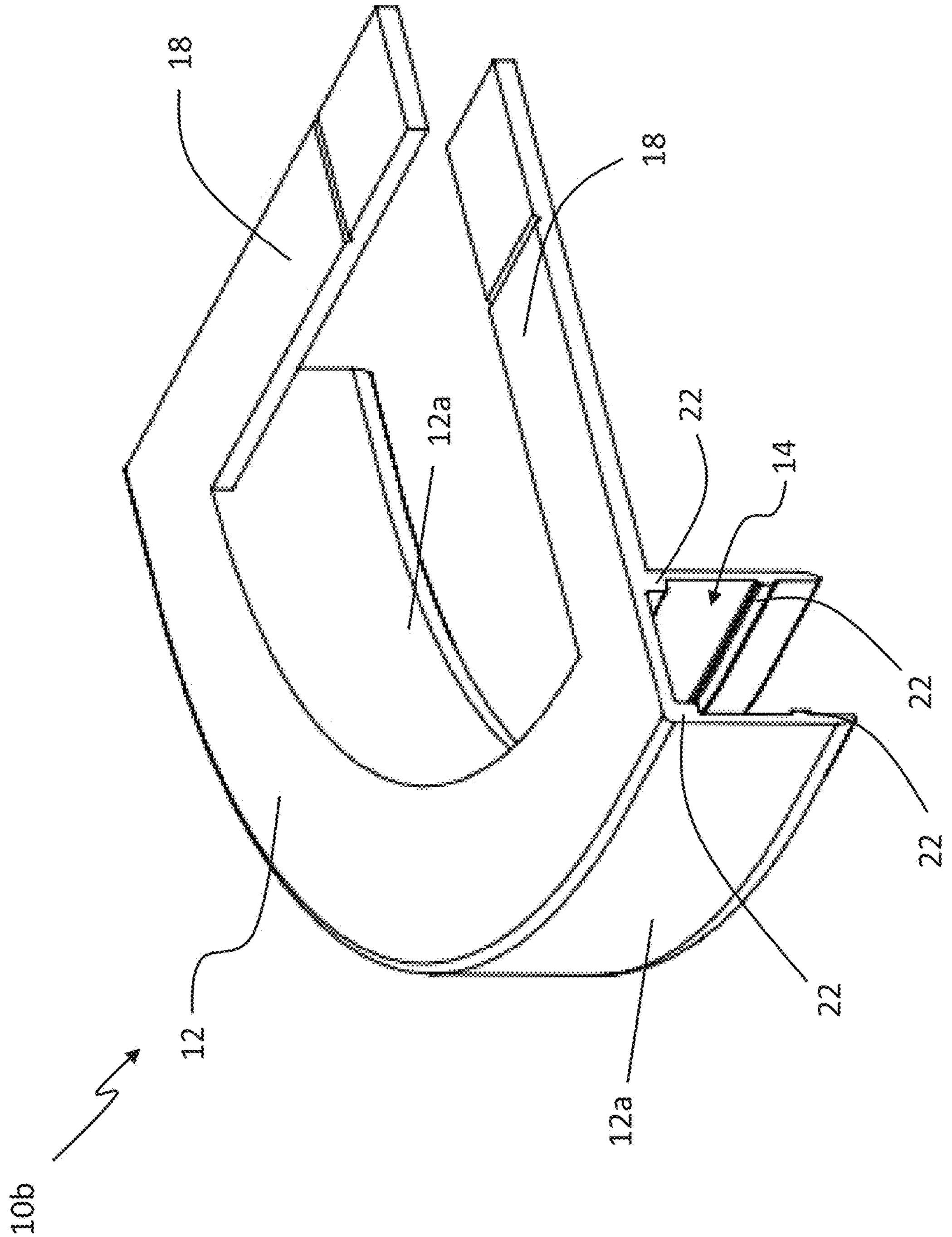
FIG. 6 is an isometric view illustration of the adjustable lighting mount in an inwards bent position, in accordance with the present disclosure.

FIG. 6 is an isometric view illustration of the adjustable lighting mount 10 in an inwards bent position, in accordance with the present disclosure. Depicted is the channel structure 14 and mounting track 22 therein, where the body 12 of the adjustable lighting mount 10 is in the inwards bent position 10*b*. With reference to FIGS. 1A-1B and 6, in this configuration a lighting unit 16 may be mounted within the channel structure 14, and the body 12 or the entirety of the adjustable lighting mount 10 may be further mounted to a pool deck, at the edge of a pool, or at any surface edge that has outside and inside bends that are of various curvatures and shapes.

The lighting mount 10 may be mounted such that the mounting members 18 are substantially level or parallel with respect to the surface edge or overhang, and a sidewall 12*a* of the body 12 rests against the surface edge, in this example, the edge of a pool decking. In this configuration, the lighting unit 16 faces downwards and into the water of the pool, illuminating the pool water along the edges. In other examples, the body 12 will be mounted under the surface edge of the pool decking such that the body 12 and the entirety of the adjustable lighting mount 10 may be hidden from view when looking at the pool from above. In this configuration, the pool surface water is illuminated from the edges. In an alternative example, the adjustable lighting mount 10 may be configured such that the lighting unit 16 faces in any direction, including towards persons or objects in the pool, upwards, or towards the edge of the pool decking. Each lighting configuration may have certain advantages in terms of pool aesthetics and ambiance achieved. FIG. 6 contains many of the same features, structures, and functions as described relative to FIGS. 1-5B, which are not restated for FIG. 6 for brevity in disclosure.

Figure 7A:
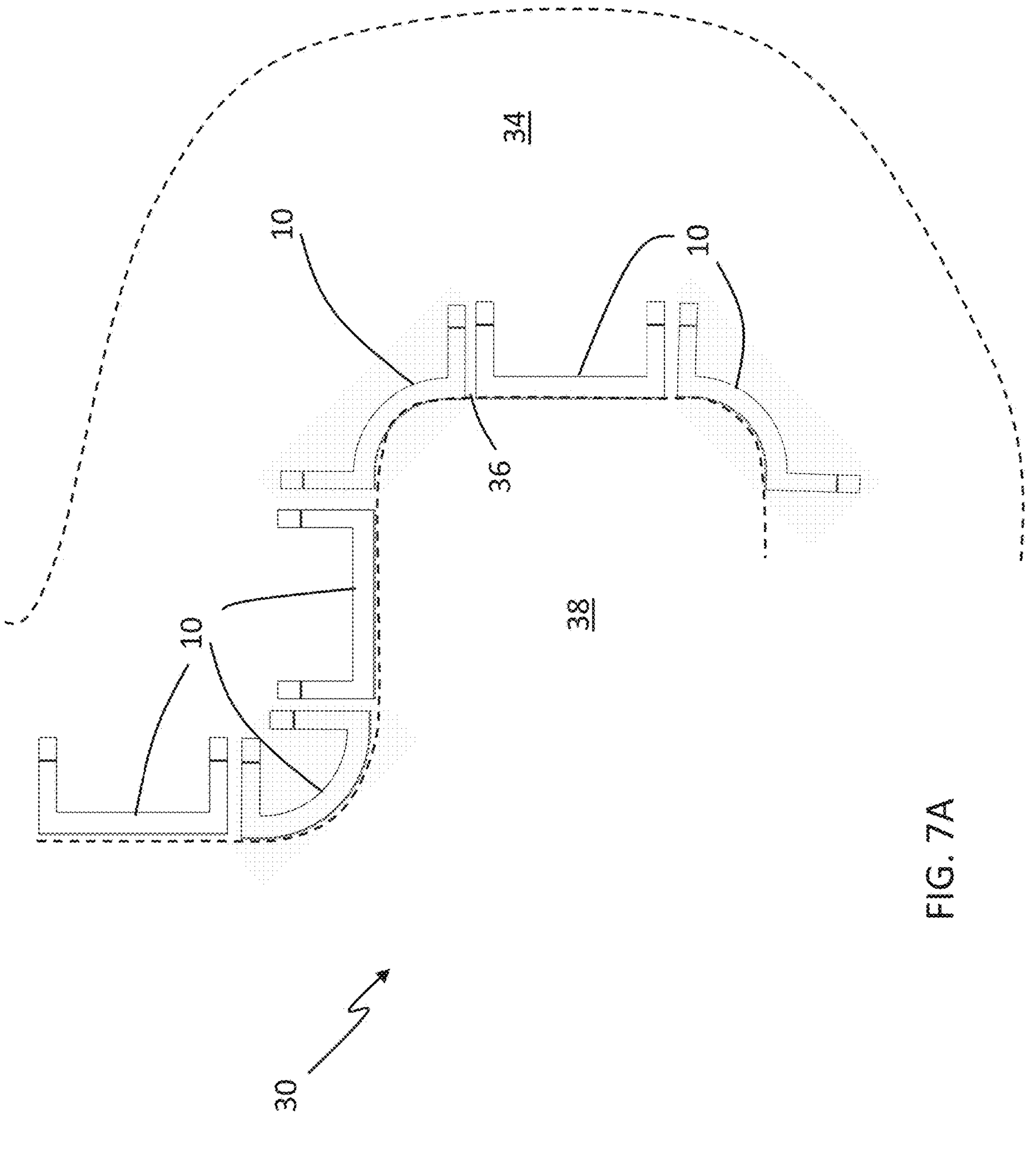
FIG. 7A is a top view illustration of various adjustable lighting mounts in position around a pool, in accordance with the present disclosure.
Figure 7B:
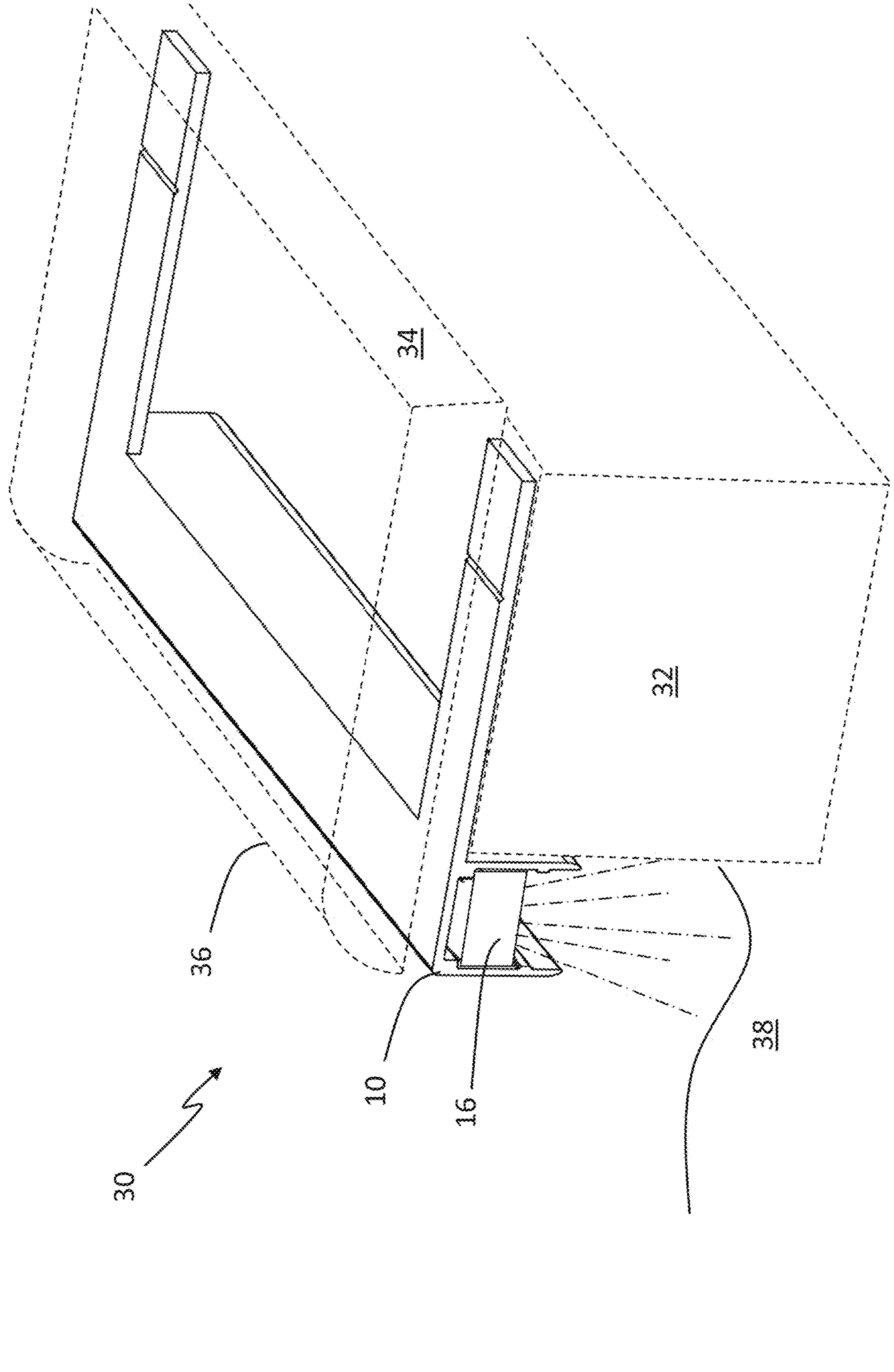
FIG. 7B is a side, isometric view illustration of the adjustable lighting mount in a position along a pool wall, in accordance with the present disclosure.

FIGS. 7A-7B provide in-use or operational examples of the lighting mount 10. Specifically, FIG. 7A is a top view illustration of various adjustable lighting mounts 10 in various positions around a pool 30, in accordance with the present disclosure. FIG. 7B is a side, isometric view illustration of the adjustable lighting mount 10 in a position along a pool wall 32, in accordance with the present disclosure. With reference to FIGS. 1A-7B, the lighting mount 10 is positioned around a perimeter of a pool 30 in a position fully or substantially below the pool decking 34. In this position, the lighting mount 10 may be positioned vertically above the pool wall 32, with the channel structure 12 positioned proximate to the coping 36 of the pool decking 34, which generally is positioned over the edge of the pool wall 32 vertically above the edge of the water in the pool 30, such that the lighting unit 16 held by the lighting mount 10 can illuminate the water in the pool 30. As can be seen in FIG. 7A, the lighting mounts 10 can be used along various perimeter sections of the pool 30 which have different shapes, such as along straight perimeter sections, inward curved sections, or outward curved sections. The shape of the lighting mount 10 can be adjusted to substantially match the shape of the particular perimeter section of the pool 30, and the lighting mount 10 can be adjusted to nearly any shape, thereby allowing manufacturers to produce a single style of lighting mount 10 that can be used for an infinite number of shapes of pool perimeter sections. As shown in FIG. 7B, the lighting mount 10 is positioned over the water in the pool 30, such that the lighting unit 16 is able to illuminate the edge of the water 38.

Figure 8A:
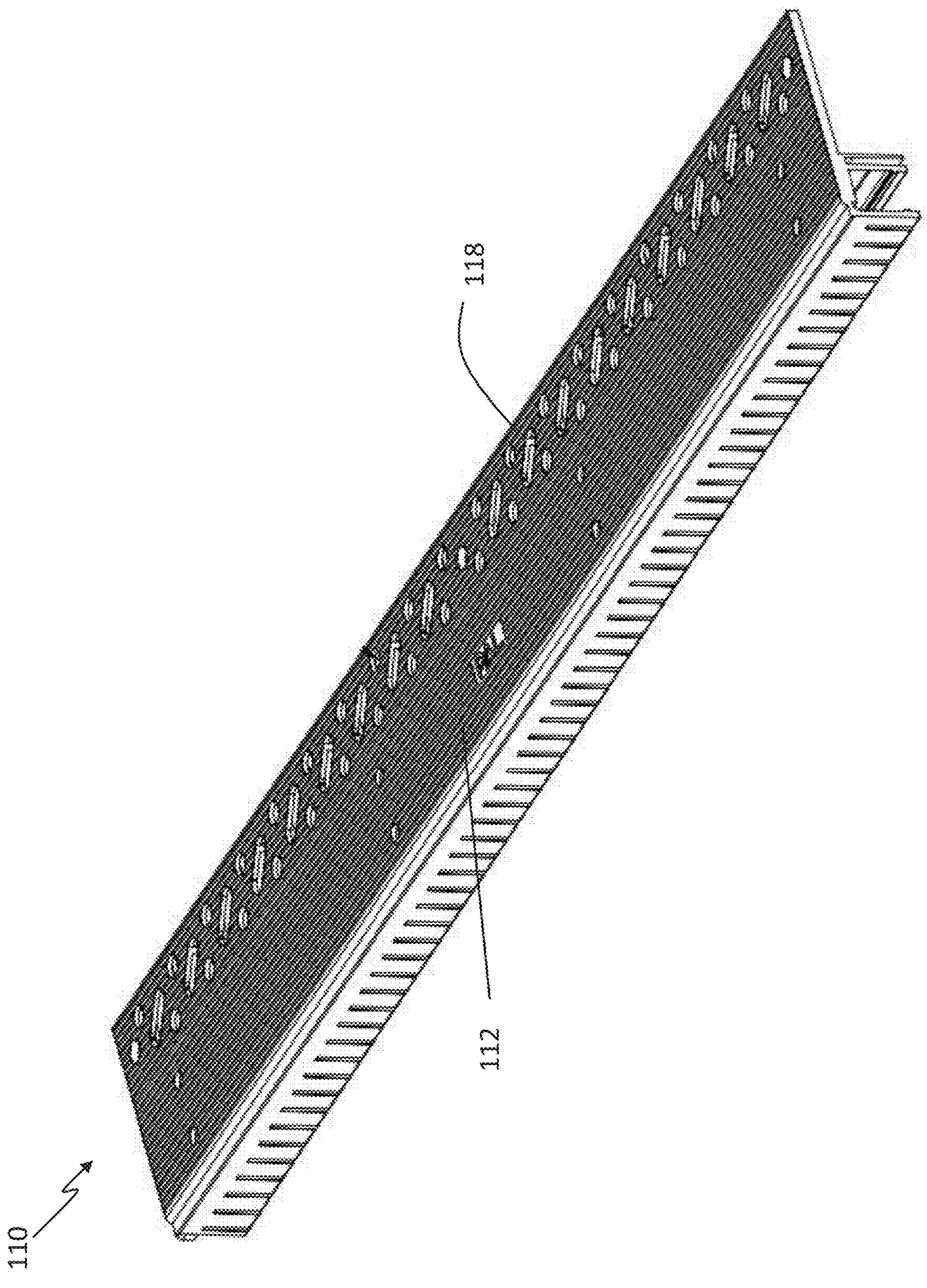
FIGS. 8A-8B are isometric view illustrations of a lighting mount, in accordance with the present disclosure.
Figure 8B:
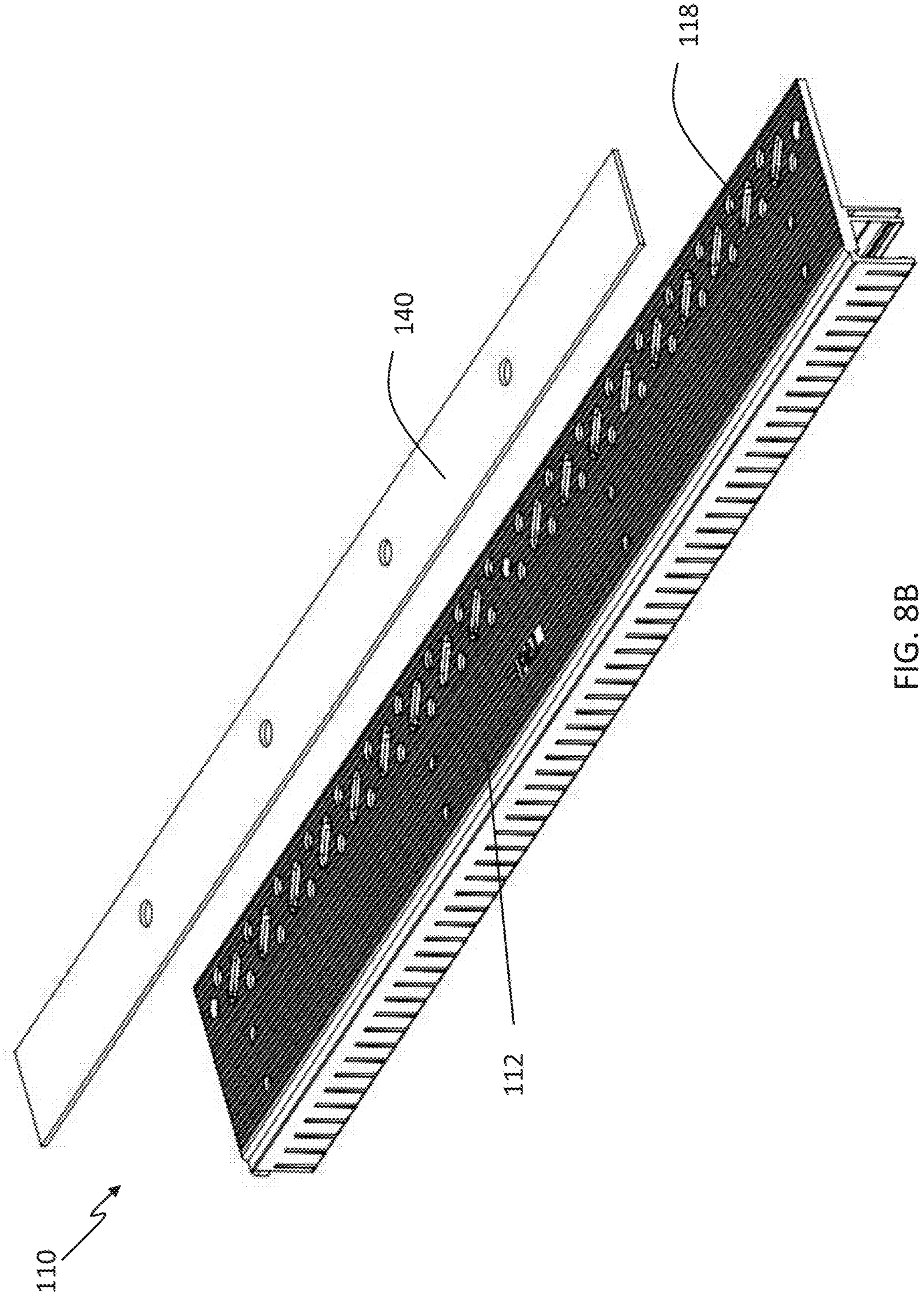
Figure 8C:
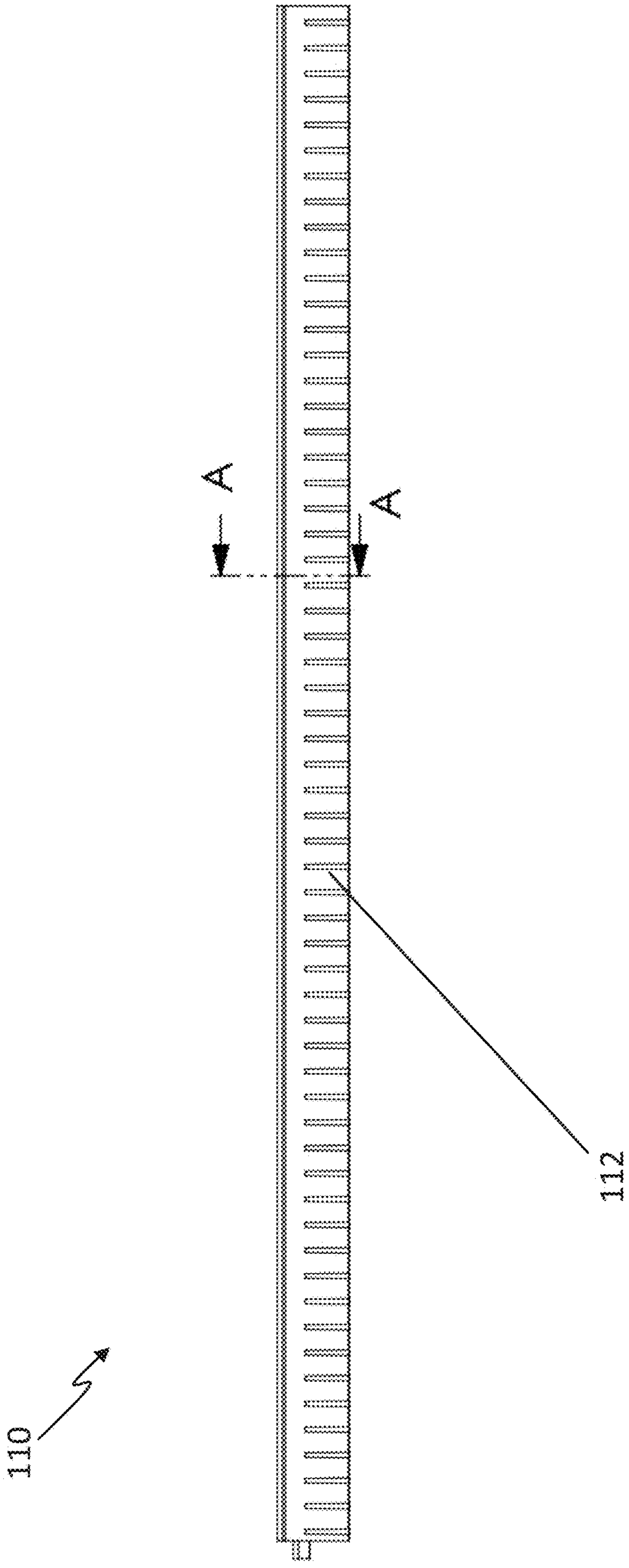
FIG. 8C is a front view illustration of the lighting mount of FIGS. 8A-8B, in accordance with the present disclosure.
Figure 8D:
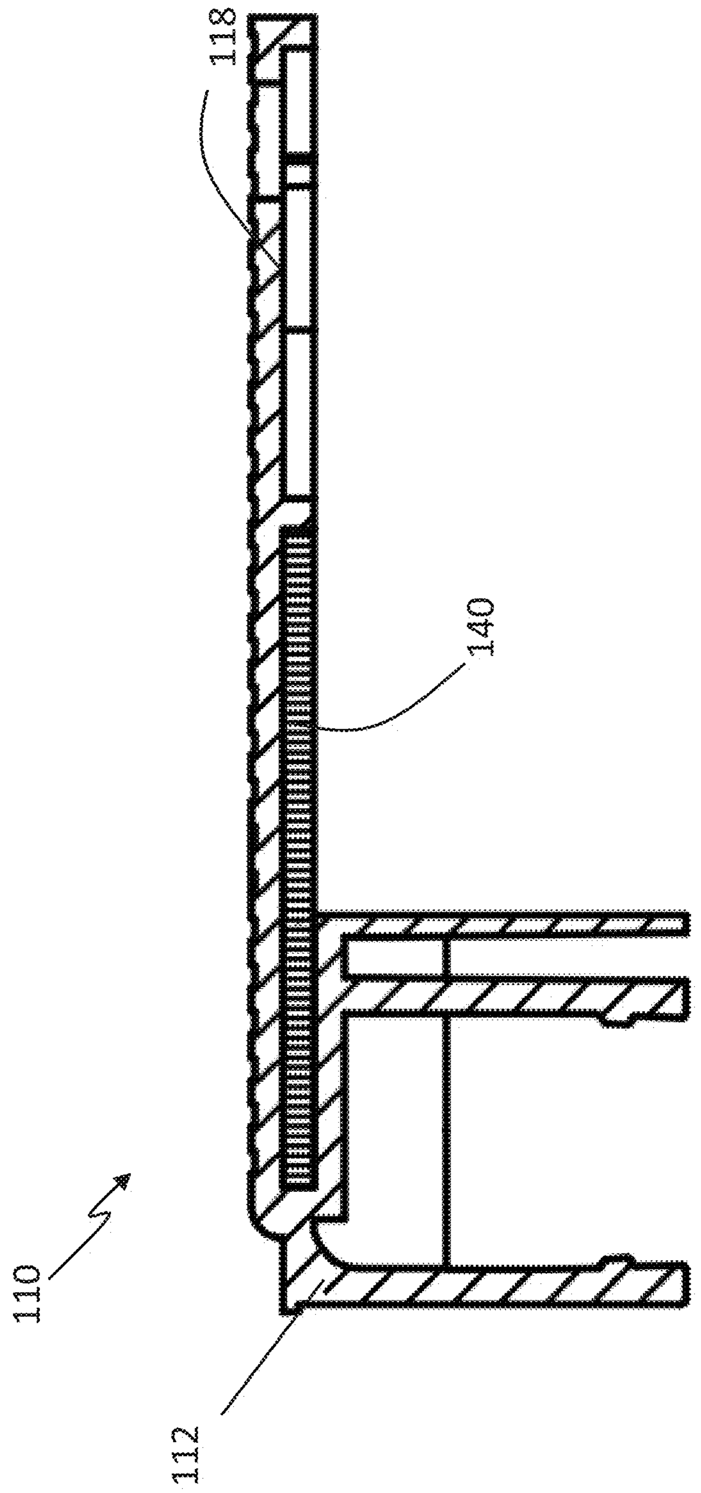
FIG. 8D is a side cross-sectional view illustration of the lighting mount of FIG. 8C, in accordance with the present disclosure.

FIGS. 8A-8D are illustrations of a lighting mount 110 with a variation of design. Specifically, FIGS. 8A-8B are isometric view illustrations of a lighting mount 110, in accordance with the present disclosure. FIG. 8C is a front view illustration of the lighting mount 110 of FIGS. 8A-8B, in accordance with the present disclosure. FIG. 8D is a side cross-sectional view illustration of the lighting mount 110 of FIG. 8C along the line A-A, in accordance with the present disclosure. As shown, the lighting mount 110 incudes an elongated body 112 with a continuous mounting member 118 which extends substantially along the entire length of the body 112. The lighting mount 110 may include many of the features discussed relative to FIGS. 1A-7B.

Additionally, as shown in FIGS. 8B and 8D, the lighting mount 110 may include a stainless-steel reinforcement plate 140 embedded within at least one of the body 112 or the mounting members 118. The reinforcement plate 140 may be used in the lighting mount 110 to integrate additional structural strength in the device, which allows for a greater overhang over the pool water and increased durability against impact and load-bearing stresses. In use, the lighting mount 110 is installing in a pool as discussed relative to FIGS. 7A-7B, but with the reinforcement plate 140 positioned beneath the pool decking or coping stone, which helps ensure that forces applied to the extend edge of the lighting mount 110 are adequately distributed throughout the structure such that it stays in place and operates as intended, without deformation or malfunction. As shown in FIG. 8D, the reinforcement plate 140 may be partially or fully embedded within the top of the body 112 and extending to the mounting members 118. In one example, as shown, the reinforcement plate 140 may be removeable from the body 112 and the mounting members 118, thereby allowing the lighting mount 110 to be adjustable in use with or without the reinforcement plate 140. It is noted that while the example of FIGS. 8A-8D illustrates the mounting member 118 as continuous, the use of the reinforcement plate 140 can be used with the example of FIGS. 1A-7B, such as where the mounting plate is removed when the device is adjusted in shape, or where the reinforcement plate 140 is provided with standardized straight and/or curved shapes to be used as needed along a pool perimeter.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An adjustable track for a lighting device, comprising:

a body having a channel structure with a center axis aligned with a length thereof, the channel structure configured to hold a lighting unit; and at least two mounting members extending from two or more edges of the channel structure, wherein the mounting members are positioned spaced away from each other and positioned at a substantially perpendicular angle relative to the center axis, and wherein the shape of the channel structure is adjustable by applying a force on the at least two mounting members, wherein the shape of the channel structure is adjustable between at least: a straight shape, an inward curved shape, or an outward curved shape, thereby bending the channel structure around a midpoint between the at least two mounting members and adjusting the center axis.

2. The adjustable track for a lighting device of claim 1, wherein a top surface of the body is substantially flush with a top surface of the at least two mounting members, thereby forming a continuous face between the top surface of the body and the top surface of the at least two mounting members.

3. The adjustable track for a lighting device of claim 1, wherein the angle the mounting members are positioned relative to the center axis is 90 degrees.

4. The adjustable track for a lighting device of claim 1, wherein the shape of the channel structure is at least one of: non-permanently adjustable or semi-permanently adjustable, wherein the shape of the channel structure is re-shapable.

5. The adjustable track for a lighting device of claim 1, wherein the channel structure has a neutral position, wherein the shape of the channel structure is adjustable by biasing it from the neutral position.

6. The adjustable track for a lighting device of claim 1, wherein the channel structure is curable to maintain the shape of the channel structure.

7. The adjustable track for a lighting device of claim 1, further comprising a plurality of mounting tracks positioned within the channel structure, wherein the plurality of mounting tracks mechanically retain the lighting unit in the channel structure.

8. The adjustable track for a lighting device of claim 7, wherein the plurality of mounting tracks are positioned on a sidewall of the body.

9. The adjustable track for a lighting device of claim 7, wherein the plurality of mounting tracks are positioned on two opposing sidewalls of the body.

10. A pool lighting device, comprising:

a body having a channel structure with a center axis aligned with a length thereof;

at least two mounting members extending from two or more edges of the channel structure, wherein the mounting members are positioned spaced away from each other and positioned at a substantially perpendicular angle relative to the center axis, and wherein the shape of the channel structure is adjustable by applying a force on the at least two mounting members, wherein the shape of the channel structure is adjustable between at least: a straight shape, an inward curved shape, or an outward curved shape to substantially match a shape of a perimeter section of a pool, thereby bending the channel structure around a midpoint between the at least two mounting members and adjusting the center axis; and a lighting unit held within the channel structure, wherein the lighting unit is configured to face downward, thereby illuminating a quantity of water within the pool.

11. The pool lighting device of claim 10, wherein a top surface of the body is substantially flush with a top surface of the at least two mounting members, thereby forming a continuous face between the top surface of the body and the top surface of the at least two mounting members.

12. The pool lighting device of claim 10, wherein the angle the mounting members are positioned relative to the center axis is 90 degrees.

13. The pool lighting device of claim 10, wherein the shape of the channel structure is at least one of: non-permanently adjustable or semi-permanently adjustable, wherein the shape of the channel structure is re-shapable.

14. The pool lighting device of claim 10, wherein the channel structure has a neutral position, wherein the shape of the channel structure is adjustable by biasing it from the neutral position.

15. The pool lighting device of claim 10, further comprising a plurality of mounting tracks positioned within the channel structure, wherein the plurality of mounting tracks mechanically retain the lighting unit in the channel structure.

16. The pool lighting device of claim 15, wherein the plurality of mounting tracks are positioned on a sidewall of the body.

17. The pool lighting device of claim 15, further comprising a stainless-steel reinforcement plate embedded within at least one of the body or the mounting tracks.

18. A shape-adjustable pool lighting device, comprising:

a body having a channel structure;

at least two mounting members extending from two or more edges of the channel structure, wherein the mounting members are positioned spaced away from each other and positioned at a substantially perpendicular angle relative to the channel structure, wherein the shape of the channel structure is adjustable by applying a force on the at least two mounting members, and wherein the shape of the channel structure along a length thereof is adjustable between at least: a straight shape, an inward curved shape, or an outward curved shape, thereby bending the channel structure around a midpoint between the at least two mounting members to substantially match a shape of a perimeter section of a pool; and a lighting unit held within the channel structure, wherein the lighting unit is configured to face downward, thereby illuminating a quantity of water within the pool.

* * * * *